Patented Aug. 1, 1944

2,354,742

UNITED STATES PATENT OFFICE 2,354,742

PROCESS OF PRODUCING ALKALI-METAL SULPHIDES, SELENIDES, AND TELLURIDES

George Lewis Cunningham, Niagara Falls, N. Y., assignor to The Mathieson Alkali Works, Inc., New York, N. Y., a corporation of Virginia No Drawing. Application April 25, 1940, Serial No. 331,596

9 Claims. (Cl. 23—134)

This invention relates to the manufacture of monosulphides, monoselenides, and monotellurides of the alkali metals. The invention provides a new process by which anhydrous monosulphides, monoselenides, or monotellurides of the alkali metals of a high degree of purity may be advantageously produced.

Alkali metal sulphides have been prepared from impure alkali metal sulphates by reduction of the sulphates with coal or reducing gases such as hydrogen or carbon monoxide. Sulphides obtained according to such processes are more or less contaminated by undesirable impurities such as sodium hydrosulphide, sodium polysulphide, sodium carbonate, sodium sulphate, and sodium hydroxide. The sulphides produced by the aforementioned process when recrystallized with water are found to contain considerable amounts of water of crystallization.

Sodium monosulphide is commonly marketed as a crystal ($Na_2S \cdot 9H_2O$), or as a concentrate containing about 60% $Na_2S$, this being in the form of chips, pellets, broken fused lumps, or solid fused lumps. The anhydrous sodium sulphide obtained from high temperature furnacing processes is generally marketed in the form of broken fused lumps. Such anhydrous material generally contains a considerable amount of impurities from the reducing agent used in the furnacing process.

The product produced in accordance with this invention differs from the crystal and so-called concentrate forms of sodium monosulphide in that it contains over 95% of $Na_2S$ and is substantially free from water. The product of the invention differs from the available anhydrous forms of sodium sulphide in that it is granular in form and is free from insoluble materials present in the products produced by reduction of sodium sulphate.

According to this invention monosulphides, monoselenides, and monotellurides of the alkali metals are produced by reacting an alkali metal polysulphide, polyselenide, or polytelluride with an alkali metal amalgam in an anhydrous alcoholic medium. The process enables such compounds to be produced in anhydrous form with a high degree of purity.

Thus, in practicing the process of this invention sodium monosulphide is produced by reacting sodium amalgam with sodium polysulphide in an anhydrous alcoholic medium. In the reaction which occurs, the polysulphide is reduced to the normal monosulphide, the amount of sodium sulphide in the reaction product approaching that equivalent, stoichiometrically, to the total sulphur content of the sodium polysulphide supplied to the reaction. The reaction may be typified as follows:

Sodium amalgam + $Na_2S_x$ = $XNa_2S$ + mercury

In the complete process of the invention, a part of the normal sulphide thus produced is separated as the product of the process and the remainder is used to form, by reaction with sulphur, the polysulphide supplied to the reaction with the sodium amalgam. In effect, the invention thus provides for the direct production of sodium monosulphide from sodium, supplied to the process as sodium amalgam, and elemental sulphur, supplied to the process as such. The reaction to form the polysulphide and the reduction of the polysulphide with the sodium amalgam can, in fact, be carried out concurrently. The sodium amalgam can be produced by any convenient mercury cathode electrolysis, the Castner process or the Krebs process for example.

The process of the invention will be illustrated by reference to the following examples, it being understood that the process is not intended to be limited thereto:

*Example 1*

To a solution containing about 100 parts (by weight) of methyl alcohol and 16.2 parts of sodium sulphide is added 6.6 parts of sulphur. The resulting solution is heated to 50° C. until the sulphur is dissolved. The resulting red alcoholic solution of sodium polysulphide, $Na_2S_x$, is then reacted with a sodium amalgam containing about 0.1% (by weight) of sodium at 50° C. until 9.54 parts of sodium have been added, the solution then being colorless. One-half of this solution, that is about 66.2 parts, are then removed and 50 parts of methyl alcohol are evaporated therefrom. This will give about 16.2 parts of anhydrous sodium monosulphide analyzing 96.83% $Na_2S$. The other half of the solution containing about 50 parts of methyl alcohol and about 16.2 parts of sodium sulphide is mixed with about 50 parts of methyl alcohol and about 6.6 parts of sulphur and the resulting solution is then treated as indicated above to repeat the process.

*Example 2*

To a solution containing about 400 parts (by weight) of ethyl alcohol and about 16.2 parts of sodium sulphide is added about 6.64 parts of sulphur. The solution is heated to about 60° C. until the sulphur is dissolved. The resulting red alcoholic solution of sodium polysulphide, $Na_2S_x$, is now reacted with a sodium amalgam containing 0.3% (by weight) of sodium at 40° C. until about 9.54 parts of sodium have been added. About one-half of this solution, that is about 216 parts, are removed and about 200 parts of ethyl alcohol are evaporated therefrom. This will give about 16 parts of anhydrous sodium monosulphide, analyzing about 97% $Na_2S$. The other half of the solution is mixed with about 200 parts of ethyl alcohol and about 6.64 parts of sulphur as indicated above and used to repeat the process.

The efficiency of the process may be improved by carrying out certain precautions. Air and oxygen should be excluded from the alcoholic solutions of both the sulphides and polysulphides since these compounds are rather readily oxidized to thiosulphates, sulphites, and sulphates. This oxidation not only causes a loss of material but also introduces impurities into the finished product.

There is a tendency for the mercury to react with the hot alcoholic polysulphide solution to form mercury sulphide when the amalgam is practically discharged. This sulphide is somewhat soluble in strong alcoholic sulphide solutions, and consequently would tend to contaminate the sodium sulphide desired as a final product. This tendency for mercury to react with the polysulphide solution can be avoided by introducing an adequate supply of sodium amalgam into the reduction reaction. Any mercury sulphide formed and dissolved can be discharged from the sodium sulphide solution by reaction with sodium amalgam.

Discharge of the sodium amalgam with alcohol to form sodium alcoholate and hydrogen gas is also to be avoided, as such discharge, to whatever extent it occurs, introduces sodium alcoholate into the product as an impurity and also lowers the efficiency of the reaction. To minimize such losses the vessel in which the reaction is carried out should preferably be so constructed that no electrically conducting material is in contact with the alcoholic polysulphide solution and the amalgam at the same time, since such a material will act as an electrode and cause a rapid evolution of hydrogen. The sulphur of the amalgam should of course be kept free of dirt and scum, since these materials also encourage hydrogen evolution. A slight evolution of hydrogen is not harmful except in so far as it lowers the sodium efficiency and introduces possible traces of sodium alcoholate into the sodium sulphide product.

The temperatures used in carrying out the invention may be varied depending somewhat upon the reaction speed desired. At very low temperatures, approaching 0° C. for example, the reaction is very slow; temperatures within the range up to the boiling point of the solution, however, under the pressure prevailing, are useful in carrying out the invention.

Amalgams up to the limits of concentration which can be prepared by electrolysis are useful in practicing the process of the invention. Amalgams containing about 0.1% to 0.3% of sodium by weight may be used with particular advantage.

In carrying out the process, elemental sulphur, and similarly elemental selenium or tellurium in the production of selenides and tellurides, can be supplied to the reaction forming the polysulphide, or polyselenide or polytelluride, in any convenient form.

The monosulphides of the other alkali metals, potassium and lithium for example, can be manufactured by the same process, using the corresponding amalgam in place of sodium amalgam, and the selenides and tellurides of the alkali metals can be similarly manufactured, reducing the polyselenide or polytelluride with the chosen alkali metal amalgam and forming the polyselenide or polytelluride by reacting the selenide or telluride with elemental selenium or tellurium.

I claim:

1. The process of producing alkali metal compounds of the group consisting of monosulphides, monoselenides and monotellurides which comprises reacting an alkali metal amalgam with the corresponding alkali metal compound of the group consisting of polysulphides, polyselenides and polytellurides in an anhydrous alcoholic medium.

2. The process of producing alkali metal compounds of the group consisting of monosulphides, monoselenides and monotellurides which comprises reacting an alkali metal amalgam with the corresponding alkali metal compound of the group consisting of polysulphides, polyselenides and polytellurides in an anhydrous alcoholic medium, separating part of the alkali metal compound formed and reacting another part with an element from the group consisting of sulphur, selenium and tellurium in an anhydrous alcoholic medium to form the polysulphide, polyselenide or polytelluride supplied to the reaction with the amalgam.

3. The process of producing alkali metal monosulphides which comprises reacting an alkali metal amalgam with the corresponding polysulphide in an anhydrous alcoholic medium.

4. The process of producing alkali metal monosulphides which comprises reacting an alkali metal amalgam with the corresponding polysulphide in an anhydrous alcoholic medium, separating part of the monosulphide formed and reacting another part with sulphur in an anhydrous alcoholic medium to form the polysulphide supplied to the reaction with the amalgam.

5. The process of producing sodium monosulphide which comprises reacting sodium amalgam with sodium polysulphide in an anhydrous alcoholic medium.

6. The process of producing sodium monosulphide which comprises reacting sodium amalgam with sodium polysulphide in an anhydrous alcoholic medium, separating part of the sodium monosulphide formed and reacting another part with sulphur in an anhydrous alcoholic medium to form the polysulphide supplied to the reaction with the amalgam.

7. The process of producing alkali metal compounds of the group consisting of monosulphides, monoselenides and monotellurides which comprises reacting an alkali metal amalgam with the corresponding compound of the group consisting of sulphides, selenides and tellurides and the corresponding element from the group consisting of sulphur, selenium and tellurium in an anhydrous alcoholic medium to form additional monosulphides, monoselenides or monotellurides of that alkali metal.

8. The process of producing alkali metal monosulphides which comprises reacting an alkali metal amalgam with the corresponding sulphide and sulphur in an anhydrous alcoholic medium to form additional monosulphide.

9. The process of producing sodium monosulphide which comprises reacting sodium amalgam with sodium sulphide and sulphur in an anhydrous alcoholic medium to form additional sodium monosulphide.

GEORGE LEWIS CUNNINGHAM.